United States Patent
Celik et al.

(10) Patent No.: US 12,395,255 B2
(45) Date of Patent: Aug. 19, 2025

(54) SIGNAL PROCESSING METHOD OF PROCESSING FREQUENCY DOMAIN SIGNAL DATA, AND MEASUREMENT INSTRUMENT

(71) Applicant: Rohde & Schwarz GmbH & Co. KG, Munich (DE)

(72) Inventors: Mert Celik, Munich (DE); Baris Guezelarslan, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 214 days.

(21) Appl. No.: 18/448,624

(22) Filed: Aug. 11, 2023

(65) Prior Publication Data

US 2025/0055577 A1 Feb. 13, 2025

(51) Int. Cl.
*H04B 3/46* (2015.01)
*H04B 17/23* (2015.01)
*H04B 17/318* (2015.01)

(52) U.S. Cl.
CPC ........... *H04B 17/23* (2015.01); *H04B 17/318* (2015.01)

(58) Field of Classification Search
CPC .............................. H04B 17/23; H04B 17/318
USPC ........................................................ 375/228
See application file for complete search history.

(56) References Cited

U.S. PATENT DOCUMENTS

| | | |
|---|---|---|
| 6,313,620 B1 | 11/2001 | Richardson et al. |
| 9,542,358 B1 * | 1/2017 | Gorin .................... G06F 17/142 |
| 2015/0215065 A1 * | 7/2015 | Kobayashi .............. H04L 25/08 |
| | | 375/340 |
| 2021/0232945 A1 * | 7/2021 | Guezelarslan ........... G06N 5/04 |

* cited by examiner

*Primary Examiner* — Helene E Tayong
(74) *Attorney, Agent, or Firm* — CHRISTENSEN O'CONNOR JOHNSON KINDNESS PLLC

(57) ABSTRACT

A signal processing method of processing frequency domain signal data is described. The signal processing method includes at least the steps of applying, by the signal processing circuit, a first window function and a second window function to frequency domain signal data, thereby obtaining first modified signal data and second modified signal data, wherein the second window function is different from the first window function. The modified signal data can then be transformed into time domain. The signal processing circuit or other circuitry, such as a visualization circuit, may then generate joint visualization data based on the first transformed signal data and based on the second transformed signal data, wherein the joint visualization data comprises information on both the first transformed signal data and the second transformed signal data. Further, a measurement instrument is described.

20 Claims, 4 Drawing Sheets

SIGNAL PROCESSING METHOD OF PROCESSING FREQUENCY DOMAIN SIGNAL DATA, AND MEASUREMENT INSTRUMENT

FIELD OF THE DISCLOSURE

Embodiments of the present disclosure generally relate to a signal processing method of processing frequency domain signal data. Embodiments of the present disclosure further relate to a measurement instrument.

BACKGROUND

In certain types of measurements relating to the optimized construction and configuration of radio frequency (RF) antennas, window functions have to be applied to frequency domain signal data before transforming the frequency domain signal data into the time domain. However, the applied window function not only alters the frequency domain signal data, but also the resulting time domain signal data.

Accordingly, a user has to carefully select a suitable window function that preferably does not alter desired portions of the measurement results. Alternatively or additionally, the user has to be aware of the modifications introduced by the window function into the measurement result in order to correctly interpret the measurement results.

Selecting an appropriate window function and interpreting the measurement results correctly requires a considerable amount of expertise from the user and is a common source of measurement errors.

Thus, there is a need for a signal processing method of processing frequency domain signal data and for a measurement instrument that are easier to operate.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a signal processing method of processing frequency domain signal data. In an embodiment, the signal processing method comprises the steps of determining or receiving, by a signal processing circuit, frequency domain signal data; applying, by the signal processing circuit, a first window function to the frequency domain signal data, thereby obtaining first modified signal data; applying, by the signal processing circuit, a second window function to the frequency domain signal data, thereby obtaining second modified signal data, wherein the second window function is different from the first window function; transforming, by the signal processing circuit, the first modified signal data into time domain, thereby obtaining first transformed signal data; transforming, by the signal processing circuit, the second modified signal data into time domain, thereby obtaining second transformed signal data; and generating, by a visualization circuit, joint visualization data based on the first transformed signal data and based on the second transformed signal data, wherein the joint visualization data comprises information on both the first transformed signal data and the second transformed signal data.

Therein and the following, the term "determining frequency domain signal data" is understood to denote that measurements are performed, thereby obtaining the frequency domain signal data.

In some embodiments, the measurements are performed in the frequency domain, such that the frequency domain signal data is obtained directly via the measurements performed.

The term "receiving frequency domain signal data" is understood to denote that the frequency domain signal data is received from another measurement device performing the measurements and/or that the frequency domain signal data is loaded from a memory, for example from a non-volatile memory or from a volatile memory.

The signal processing method according to the present disclosure is based on the idea to apply different window functions, namely at least the first window function and the second window function, to the same frequency domain signal data, and to generate joint time-domain visualization data for the different window functions applied. This way, a user can immediately compare modifications of the transformed signal data caused by the different window functions. This considerably simplifies assessing the impact of different window functions on the measurement results.

For example, if a portion of the first transformed signal data differs significantly from a corresponding portion of the second transformed signal data, it can be concluded that these portions are not reliable due to a significant influence of the window functions.

In another example, if a portion of the first transformed signal data does not differ significantly from a corresponding portion of the second transformed signal data, it may be concluded that these portions are reliable as the window functions do not have a significant influence on these portions.

As the first transformed signal data and the second transformed signal data are visualized together by the joint visualization data, the user can immediately assess which portions of the transformed signal data are reliable.

According to an aspect of the present disclosure, the joint visualization data, for example, is visualized on a display. In some embodiments, the display may be integrated into a measurement instrument or into a computing device being established separately from the measurement instrument. Alternatively, the display may be a separate display.

In an embodiment of the present disclosure, the frequency domain signal data has a predefined frequency bandwidth. In general, the predefined frequency bandwidth depends on a bandwidth of the signal to be analyzed. For example, the predefined frequency bandwidth may be the transmission bandwidth of a radio frequency (RF) antenna.

In some embodiments, a width of the first window function and/or a width of the second window function may be adapted based on the predefined frequency bandwidth.

According to a further aspect of the present disclosure, the first transformed signal data and the second transformed signal data each comprise, for example, a plurality of data points, wherein different data points are captured at different times. Accordingly, the individual data points each have a pair of coordinates, for example time and amplitude or time and phase.

In a further embodiment of the present disclosure, the data points are visualized in a single time domain plot. Thus, the joint visualization data relating to the first transformed signal data and the second transformed signal data is visualized in the single time domain plot. Thus, it is particularly easy for a user to asses which portions of the transformed signal data are reliable.

Another aspect of the present disclosure provides, for example, that the data points are visualized with a density-dependent color, wherein the density-dependent color depends on an area density of the data points. In other words, the data points each have a color that depends on the density of the data points in the vicinity of the respective data point.

In general, the area density of the data points is inversely proportional to the differences between sets of transformed signal data associated with different window functions. In other words, a high area density indicates reliable transformed signal data, while a low area density indicates unreliable transformed signal data.

Due to the color-coding, the user can immediately recognize which portions of the transformed signal data are reliable.

In some embodiments, the density-dependent color is adjustable via a user interface. Thus, a user may set the density-dependent color by interacting with the user interface.

According to an aspect of the present disclosure, the data points, for example, have a first color if the area density of the data points is above a first threshold, wherein the data points have a second color if the area density of the data points is below a second threshold.

In some embodiments, the first threshold may indicate whether the respective portion of the transformed signal data is reliable. Accordingly, a user can immediately recognize reliable data points as these data points have the first color.

In some embodiments, the second threshold may indicate whether the respective portion of the transformed signal data is unreliable. Accordingly, a user can immediately recognize unreliable data points as these data points have the second color.

In some embodiments, the first threshold and the second threshold may be identical. Alternatively, the first threshold and the second threshold may be different from each other. In some embodiments, the first threshold is larger than the second threshold. In this case, the data points may have a third color if the area density of the data points is below the first threshold but above the second threshold.

In some embodiments, the data points may be visualized with a density-dependent transparency, wherein the density-dependent transparency depends on an area density of the data points. In some embodiments, the transparency of the data points may be inversely proportional to the area density of the data points. Thus, unreliable data points are more transparent than reliable data points. Accordingly, a user can immediately recognize reliable data points as these data points are less transparent than unreliable data points.

In some embodiments, the density-dependent transparency is adjustable via a user interface.

In an embodiment of the present disclosure, the data points associated with the first transformed signal data are weighted differently than the data points associated with the second transformed signal data for determining an area density of the data points. Thus, data points associated with the first window function may be weighted different from data points associated with the second window function.

Therein, weighting factors applied to the data points associated with the first transformed signal data and to the data points associated with the second transformed signal data may be adjustable via a user interface and/or may be set automatically.

In some embodiments, the first window function and the second window function are selected from the group of a rectangle window, a Hamming window, a Hann window, a Kaiser window, a flat top window, a Tukey window, a Chebyshev window, and a constant.

Therein, if the first window function or the second window function is selected to be "constant", this means that no windowing is applied to the respective frequency domain signal data.

However, it is to be understood that the first window function and the second window function may be any other suitable window function.

In a further embodiment of the present disclosure, the first window function and the second window function are selectable by a user interface. Thus, a user can select the different window functions being applied to the frequency domain signal data.

According to another aspect of the present disclosure, different types of window functions and their respective characteristics, for example, are visualized by the user interface.

Therein, the term "characteristics" is understood to denote characteristic advantages, characteristic disadvantages and other characteristic properties of the window functions.

For example, the characteristic advantages may comprise portions of the transformed signal data that are typically not or only insignificantly impacted by the respective window function.

In some embodiments, the characteristic disadvantages may comprise portions of the transformed signal data that are typically significantly impacted by the respective window function.

In some embodiments, the characteristic properties may comprise general information on the respective window function, for example for which types of signal the respective window function is generally suitable. As another example, the characteristic properties may comprise information on an optimization method associated with the respective window function.

In an embodiment of the present disclosure, the first window function and/or the second window function are selected automatically based on a desired optimization selected by a user. In other words, instead of selecting the window function to be applied to the frequency domain signal data, the user selects the desired optimization to be applied to the frequency domain signal data or to the transformation of the frequency domain signal data into the time domain.

For example, the desired optimization relates to a first side lobe, a constant side lobe, amplitude accuracy, and/or a transient response.

In a further embodiment of the present disclosure, the user interface comprises a diagram, wherein the diagram is configured such that different window functions and/or optimization methods are arranged at different positions within the diagram. Thus, a user can select the different possible choices for the window functions and/or for the optimization methods by selecting the corresponding portion of the diagram.

In some embodiments, the diagram may be a radar chart. Accordingly, different window functions and/or optimization methods are arranged at different positions of the radar chart. This type of diagram may also be called "web chart", "spider chart", "spider graph", "spider web chart", or "star plot".

According to another aspect of the present disclosure, the visualization data, for example, is adapted based on a portion of the diagram selected by a user. Thus, the user can immediately observe changes due to selecting a different window function and/or a different optimization method.

Therein, the term "select" may mean that the user clicks the corresponding portion by a computer mouse, moves a cursor over the corresponding portion, taps the corresponding portion on a touch-sensitive display, selects the corresponding portion by a control knob, etc.

Embodiments of the present disclosure further provide a measurement instrument. In an embodiment, the measurement instrument comprises a signal processing circuit, a visualization circuit, and a display. In an embodiment, the measurement instrument is configured to perform the signal processing method(s) described above.

In some embodiments, the measurement instrument is configured to perform the signal processing method according to any one of the embodiments described above.

Regarding the further advantages and properties of the measurement instrument, reference is made to the explanations given above with respect to the signal processing method, which also hold for the measurement instrument and vice versa.

According to an aspect of the present disclosure, the measurement instrument, for example, is a vector network analyzer or a spectrum analyzer. However, it is to be understood that the measurement instrument may be established as any other suitable type of measurement instrument.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
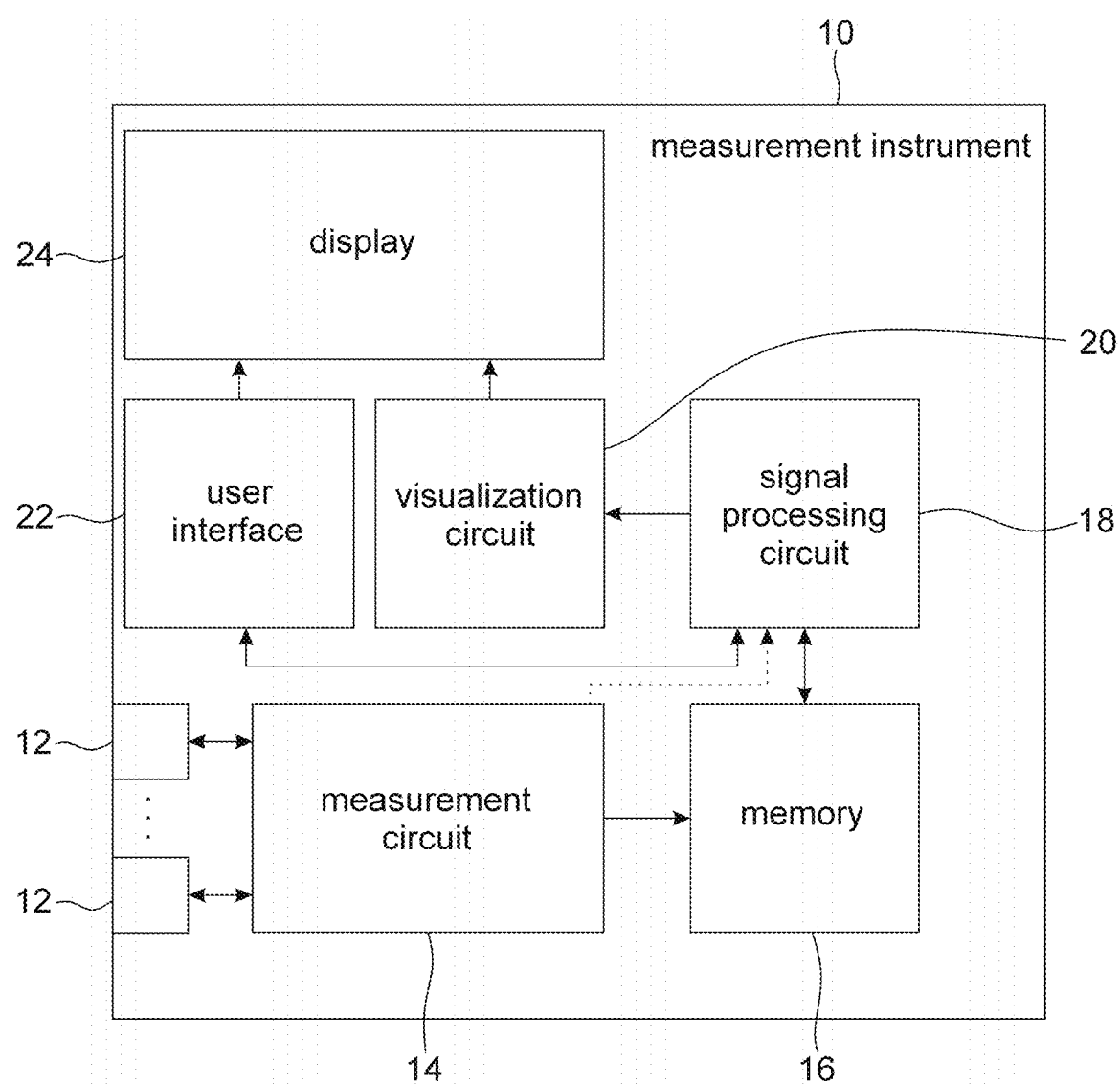
FIG. 1 schematically shows a measurement instrument according to an embodiment of the present disclosure.

FIG. 1 schematically shows an embodiment of a measurement instrument 10. In general, the measurement instrument 10 is configured to acquire and process frequency domain signal data. For example, the measurement instrument 10 is established as a vector network analyzer or a spectrum analyzer, is part of a vector network analyzer or a spectrum analyzer, etc. However, it is to be understood that the measurement instrument may be established as any other suitable type of measurement instrument.

In the embodiment shown, the measurement instrument 10 comprises at least one measurement port 12, for example a plurality of measurement ports 12. The at least one measurement port 12 is connectable to a device under test in order to conduct measurements on the device under test by a measurement circuit 14 that is connected to the at least one measurement port 12.

In some embodiments, the measurement circuit 14 is configured to apply a signal, for example a radio frequency (RF) signal, to the device under test, and/or to receive a signal, for example an RF signal, from the device under test. For example, the device under test may be an RF antenna or an RF antenna array.

Downstream of the measurement circuit 14, a memory 16 is provided. The memory 16 may comprise a volatile memory portion, for example random access memory (RAM), and/or a non-volatile memory portion. For example, the memory 16 may be established as a cyclic acquisition memory.

In the embodiment shown, the measurement instrument 10 further comprises a signal processing circuit 18 that is connected to the memory 16 and, optionally, to the measurement circuit 14. Downstream of the signal processing circuit 18, a visualization circuit 20 is provided. Further, the measurement instrument 10 comprises a user interface 22 and a display 24. The display 24 may be a touch-sensitive display that allows an user to interact with the measurement instrument 10.

Figure 2:
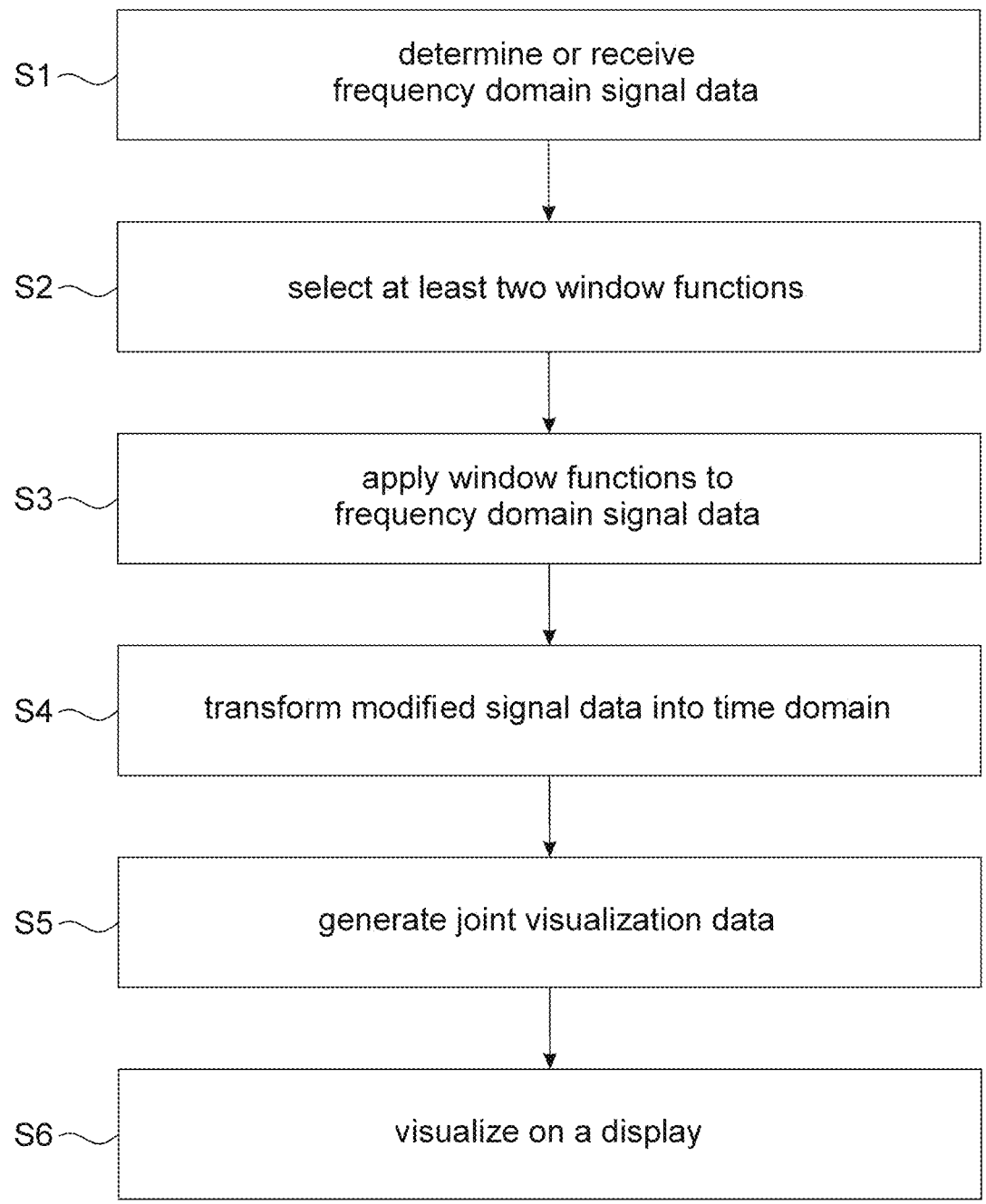
FIG. 2 shows a flow chart of a signal processing method according to an embodiment of the present disclosure.

The measurement instrument 10 is configured to perform, for example, a signal processing method of processing frequency domain signal data. An example of the signal processing method is described in the following with reference to FIG. 2.

Frequency domain signal data is determined or received by the signal processing circuit 18 (step S1).

In general, the frequency domain signal data has a predefined frequency bandwidth that depends on a bandwidth of the analyzed signal. For example, the predefined frequency bandwidth may be the transmission bandwidth of a radio frequency (RF) antenna.

The frequency domain signal data may be determined by the measurement circuit 14 and may be forwarded to the signal processing circuit 18 directly. Alternatively, the frequency domain signal data may be determined by the measurement circuit 14 and may be saved in the memory 16. For example, the frequency domain signal data may be stored in the memory 16, for example in a volatile portion of the memory 16.

The frequency domain signal data may then be loaded from the memory 16 and forwarded to the signal processing circuit 18. Alternatively, measurement data may be captured by the measurement circuit 14, and the signal processing circuit 18 may determine the frequency domain signal data by post-processing the measurement data.

At least two window functions are selected, wherein the at least two window functions comprise a first window function and a second window function (step S2).

In some embodiments, a user may select the at least two window functions via the user interface 22 directly or indirectly, as is explained in more detail hereinafter.

Figure 3:
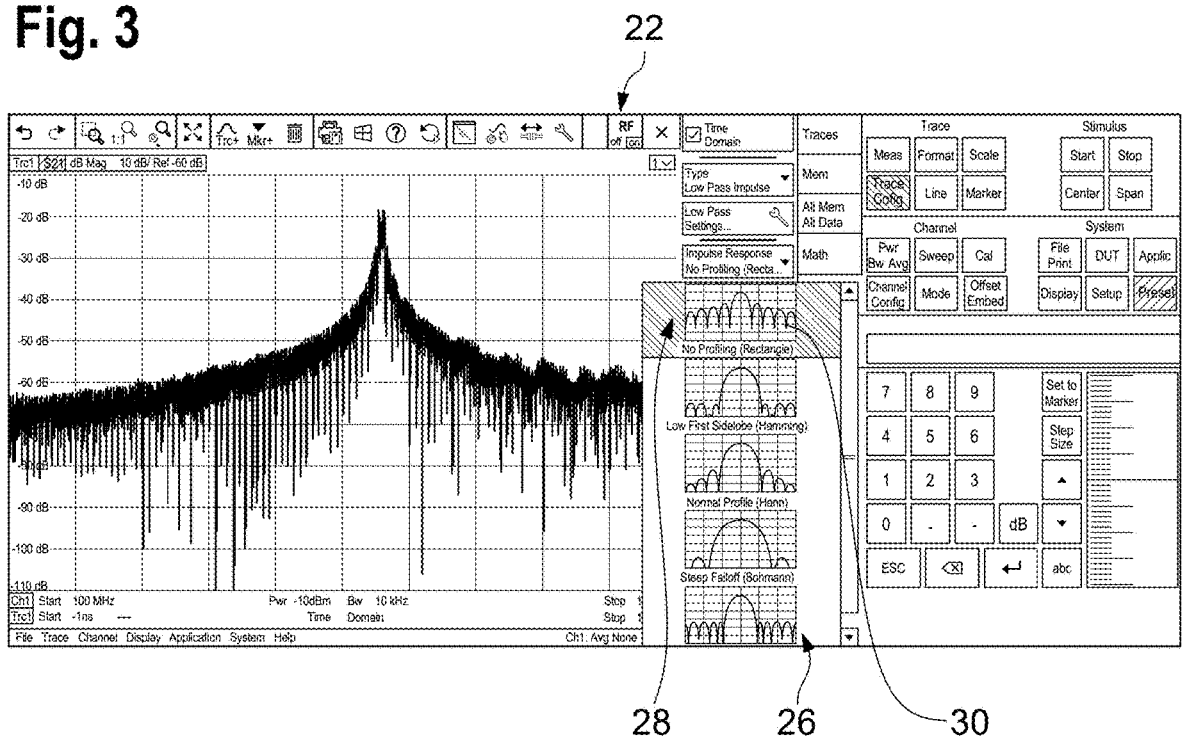
FIG. 3 schematically shows an example embodiment of a user interface of the measurement instrument of FIG. 1.

FIG. 3 shows an exemplary embodiment of the user interface 22 that may be displayed on the display 24.

The user interface 22 comprises a diagram 26 that allows the user to select the at least two window functions from a plurality of window functions, e.g. by touching the corresponding portion on the display 24 or by selecting the corresponding portion with a computer mouse, etc. For example, the user may select the at least two window functions from a rectangle window, a Hamming window, a Hann window, a Kaiser window, a flat top window, a Tukey window, a Chebyshev window, and a constant.

In the example embodiment shown in FIG. 3, the diagram 26 comprises a first portion 28 that is allocated to a first window function, namely a rectangle window. In the first portion of the diagram 26, the name of the first window function ("Rectangle") and characteristics of the first window function are visualized. In general, the characteristics may comprise characteristic advantages, characteristic disadvantages and/or other characteristic properties of the respective window function.

In the shown example, the first portion 28 comprises a sketch 30 of typical results obtained by applying the first window function. In some embodiments, the first portion 28 further comprises information on an optimization method that is associated with the first window function ("No Profiling").

The diagram 26 comprises further portions that are allocated to the remaining window functions of the plurality of window functions, wherein these portions are configured analogously to the first portion 28.

Thus, in the example embodiment shown in FIG. 3, the characteristics of the respective window functions are displayed to a user, for example the optimization methods associated with the window functions, and the user may directly select the appropriate window functions based on the displayed characteristics.

Figure 4:
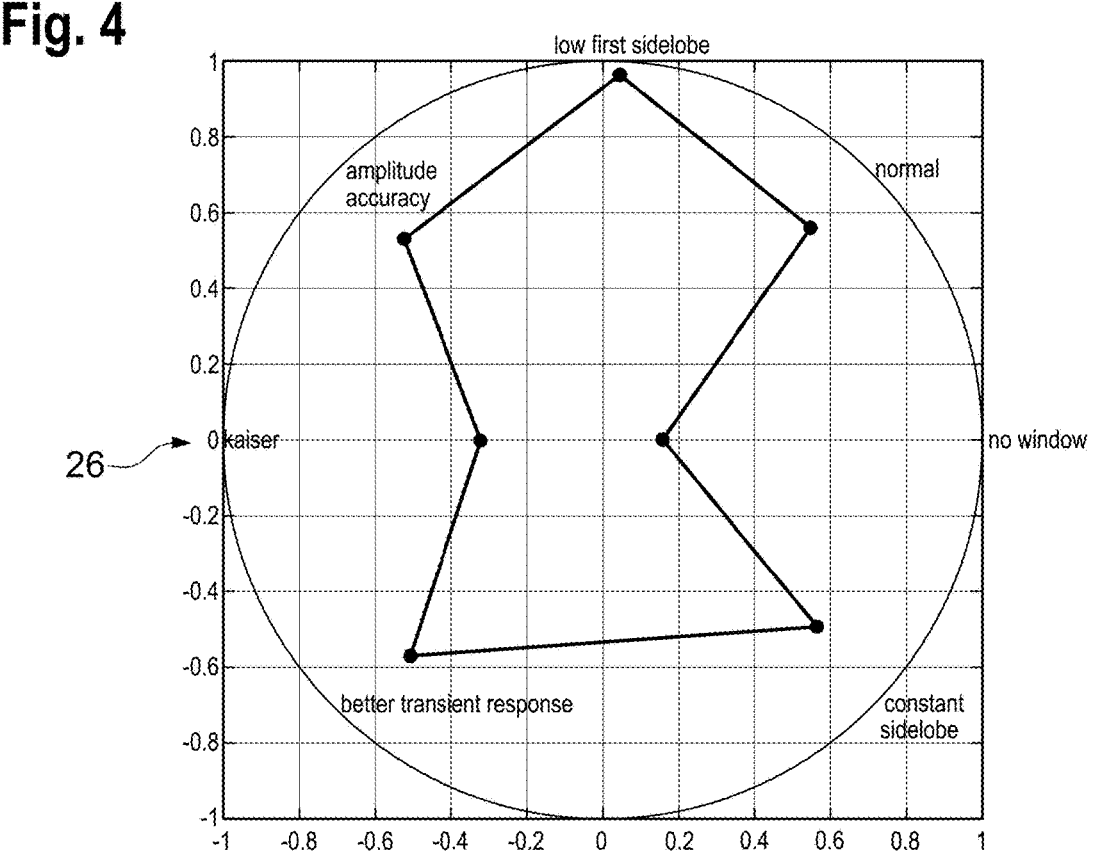
FIG. 4 schematically shows a further example embodiment of a portion of the user interface of FIG. 3.

FIG. 4 shows a further example embodiment of the diagram 26. In this embodiment, the diagram 26 is established as a radar chart. The radar chart allows the user to choose one or several desired optimization methods to be applied to the frequency domain signal data, as well as their relative weighting. In the example embodiment shown in FIG. 4, the selectable optimization methods are "low first sidelobe", "normal", "no window", "constant sidelobe", "better transient response", "Kaiser", and "amplitude accuracy".

Based on the selected optimization methods, the signal processing circuit 18 may automatically select the appropriate window functions, namely the window functions associated with the selected optimization methods. Thus, in this case, the user selects the at least two window functions indirectly.

The at least two selected window functions are each applied to the frequency domain signal data by the signal processing circuit 18, thereby obtaining at least two sets of modified signal data (step S3).

In some embodiments, the first window function is applied to the frequency domain signal data, thereby obtaining first modified signal data. The second window function is applied to the frequency domain signal data, thereby obtaining second modified signal data, etc.

The at least two sets of modified signal data are transformed into the time domain by the signal processing circuit 18, thereby obtaining at least two sets of transformed signal data (step S4).

In some embodiments, the first modified signal data is transformed into the time domain, thereby obtaining first transformed signal data. The second modified signal data is transformed into the time domain, thereby obtaining second transformed signal data, etc. For example, the signal processing circuit 18 may apply a fast Fourier transform to the sets of modified signal data, respectively.

Joint visualization data is generated by the visualization circuit 20 based on the at least two sets of transformed signal data (step S5).

The resulting visualization data is visualized on the display 24 (step S6).

In general, the joint visualization data comprises information on each of the at least two sets of transformed signal data. For instance, the at least two sets of transformed signal data each comprise a plurality of data points, wherein different data points are captured at different times. The individual data points each have a pair of coordinates, for example time and amplitude, or time and phase. Thus, the visualization data comprises information on each of the data points of each of the at least two sets of transformed signal data.

Figure 5:
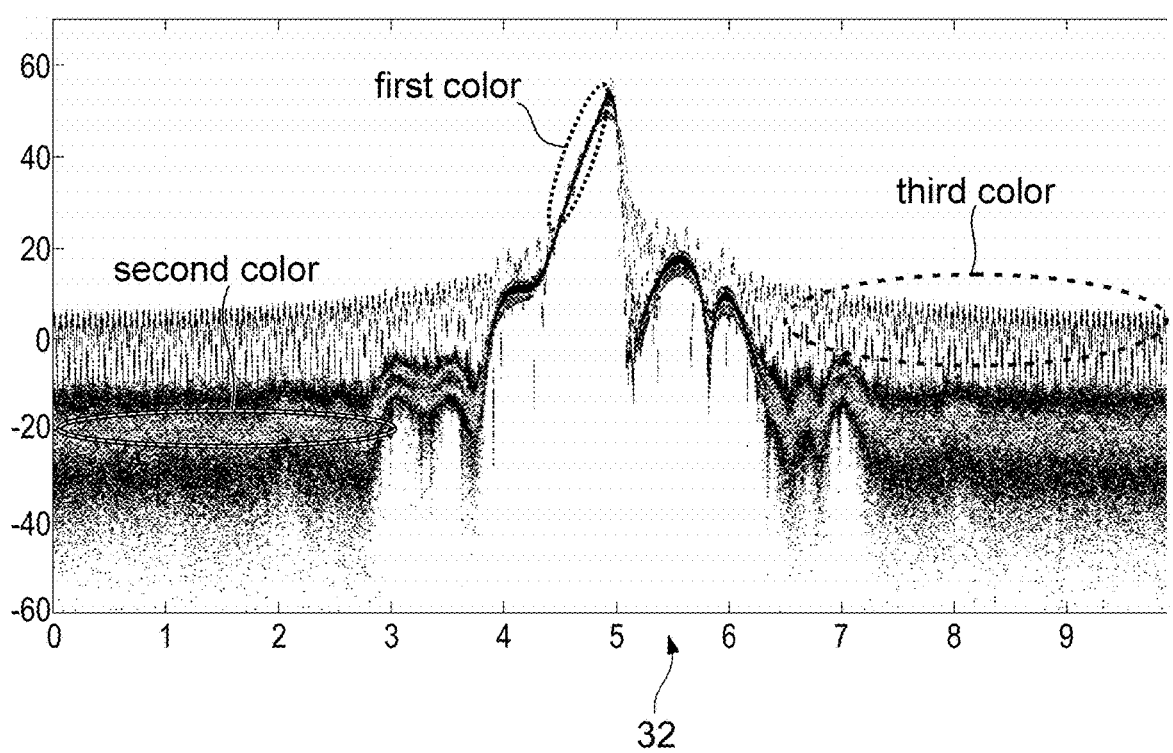
FIG. 5 shows an example of the time domain plot obtained by the signal processing method of FIG. 2.

In some embodiments, as is illustrated in FIG. 5, the data points may all be visualized in a single time domain plot 32. In the visualization data, the number of data points displayed may be scaled in order to account for a resolution of the display 24 if necessary. If N data points are captured along the time axis, and if the display has M horizontal pixels, the number of data points displayed may be scaled by a factor N/M.

As is further illustrated in FIG. 5, the data points are visualized with a density-dependent color. The density-dependent color depends on an area density of the data points, i.e., on the area density of other data points in the vicinity of the respective data point. Each color, for example the first color, the second color, and the third color, are different from each other. For example, the first color may be red, the second color may be blue, and the third color may be yellow.

The density-dependent color may be adjustable via a user interface. Thus, a user may set the density-dependent color by interacting with the user interface.

According to one embodiment, the density-dependent color may be continuous or quasi-continuous, i.e., the color of each data point may be selected from a predefined (quasi-)continuous color palette.

According to another embodiment, the data points may have a first color if the area density of the data points is above a first threshold, which is an upper threshold, i.e. a threshold associated with high area density. For example, the first color may be red or any other suitable color.

Accordingly, data points having the first color indicate that the corresponding portion of the transformed signal data is reliable.

The data points may have a second color if the area density of the data points is below a second threshold, which is a lower threshold, i.e. a threshold associated with low area density. For example, the second color may be blue or any other suitable color.

Accordingly, data points having the second color indicate that the corresponding portion of the transformed signal data is unreliable.

In some embodiments, the first threshold and the second threshold may be identical. Alternatively, the first threshold and the second threshold may be different from each other, wherein the first threshold is larger than the second threshold. In this case, the data points may have a third color, for example yellow or any other suitable color, if the area density of the data points is below the first threshold but above the second threshold.

Of course, further thresholds and further color gradations associated with the thresholds may be provided.

Alternatively or additionally to the density-dependent color, the data points may be visualized with a density-dependent transparency. In general, the density-dependent transparency depends on the area density of the data points. In some embodiments, the transparency of the data points may be inversely proportional to the area density of the data points. Thus, unreliable data points are more transparent than reliable data points. The density-dependent transparency may be adjustable via the user interface 22.

It is noted that it is also conceivable that data points associated with different sets of transformed signal data may be weighted differently for determining the area density of the data points. For example, data points of the first transformed signal data may be weighted different from data points of the second transformed signal data. In other words, data points associated with the first window function may be weighted different than data points associated with the second window function.

In some embodiments, the user may adjust the weighting factors for the individual window functions via the user interface 22. For example, the user may select weighting factors for the different optimization methods via the diagram 26 or the radar chart shown in FIG. 4, wherein a dot closer to the origin indicates a lower weighting factor for the respective optimization method, while a dot further away from the origin indicates a higher weighting factor for the respective optimization method. The weighting factors selected for the optimization methods may be applied to the corresponding sets of transformed signal data for determining the area density.

Further, it is also conceivable that the visualization data is adapted based on a portion of the diagram 26 selected by the user.

In some embodiments, changes due to the selection of another window function and/or optimization method may be visualized in real time, such that the user can immediately observe the changes in the time domain plot 32.

Therein, the term "select" may mean that the user clicks the corresponding portion by a computer mouse, moves a cursor over the corresponding portion, taps the corresponding portion on the display 24, selects the corresponding portion by a control knob of the measurement instrument 10, etc.

Certain embodiments disclosed herein include one or more components (e.g., the measurement circuit 14, the signal processing circuit 18, the user interface 22, the display 24, etc.) that utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, display information, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuits elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implementing the functionality described herein.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions May be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a graphical processing unit (GPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In some embodiments, one or more of the components referenced above include circuitry programmed to carry out one or more steps of any of the methods disclosed herein. In some embodiments, one or more computer-readable media associated with or accessible by such circuitry contains computer readable instructions embodied thereon that, when executed by such circuitry, cause the component or circuitry to perform one or more steps of any of the methods disclosed herein.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A signal processing method of processing frequency domain signal data, wherein the signal processing method comprises the steps of
   determining or receiving, by a signal processing circuit, frequency domain signal data;
   applying, by the signal processing circuit, a first window function to the frequency domain signal data, thereby obtaining first modified signal data;
   applying, by the signal processing circuit, a second window function to the frequency domain signal data, thereby obtaining second modified signal data, wherein the second window function is different from the first window function;
   transforming, by the signal processing circuit, the first modified signal data into time domain, thereby obtaining first transformed signal data;
   transforming, by the signal processing circuit, the second modified signal data into time domain, thereby obtaining second transformed signal data; and
   generating, by a visualization circuit, joint visualization data based on the first transformed signal data and based on the second transformed signal data, wherein the joint visualization data comprises information on both the first transformed signal data and the second transformed signal data.

2. The signal processing method of claim 1, wherein the joint visualization data is visualized on a display.

3. The signal processing method of claim 1, wherein the frequency domain signal data has a predefined frequency bandwidth.

4. The signal processing method of claim 1, wherein the first transformed signal data and the second transformed signal data each comprise a plurality of data points, wherein different data points are captured at different times.

5. The signal processing method of claim 4, wherein the data points are visualized in a single time domain plot.

6. The signal processing method of claim 4, wherein the data points are visualized with a density-dependent color, wherein the density-dependent color depends on an area density of the data points.

7. The signal processing method of claim 6, wherein the density-dependent color is adjustable via a user interface.

8. The signal processing method of claim 4, wherein the data points have a first color if the area density of the data points is above a first threshold, and wherein the data points have a second color if the area density of the data points is below a second threshold.

9. The signal processing method of claim 4, wherein the data points are visualized with a density-dependent transparency, wherein the density-dependent transparency depends on an area density of the data points.

10. The signal processing method of claim 4, wherein the data points associated with the first transformed signal data are weighted differently than the data points associated with the second transformed signal data for determining an area density of the data points.

11. The signal processing method of claim 1, wherein the first window function and the second window function are selected from the group of a rectangle window, a Hamming window, a Hann window, a Kaiser window, a flat top window, a Tukey window, a Chebyshev window, and a constant.

12. The signal processing method of claim 1, wherein the first window function and the second window function are selectable by a user interface.

13. The signal processing method of claim 12, wherein different types of window functions and their respective characteristics are visualized by the user interface.

14. The signal processing method of claim 12, wherein the first window function and/or the second window function are selected automatically based on a desired optimization selected by a user.

15. The signal processing method of claim 14, wherein the desired optimization relates to a first side lobe, a constant side lobe, amplitude accuracy, and/or a transient response.

16. The signal processing method of claim 12, wherein the user interface comprises a diagram, wherein the diagram is configured such that different window functions and/or optimization methods are arranged at different positions within the diagram.

17. The signal processing method of claim 16, wherein the diagram is a radar chart.

18. The signal processing method of claim 16, wherein the visualization data is adapted based on a portion of the diagram selected by a user.

19. A measurement instrument, comprising:
a signal processing circuit, a visualization circuit, and a display, wherein the measurement instrument is configured to perform the signal processing method of claim 1.

20. The measurement instrument of claim 19, wherein the measurement instrument is a vector network analyzer or a spectrum analyzer.

* * * * *